Dec. 1, 1942.  S. W. NELSON  2,303,490
UNLOADING ATTACHMENT FOR TRUCKS
Filed Dec. 12, 1940  2 Sheets-Sheet 1
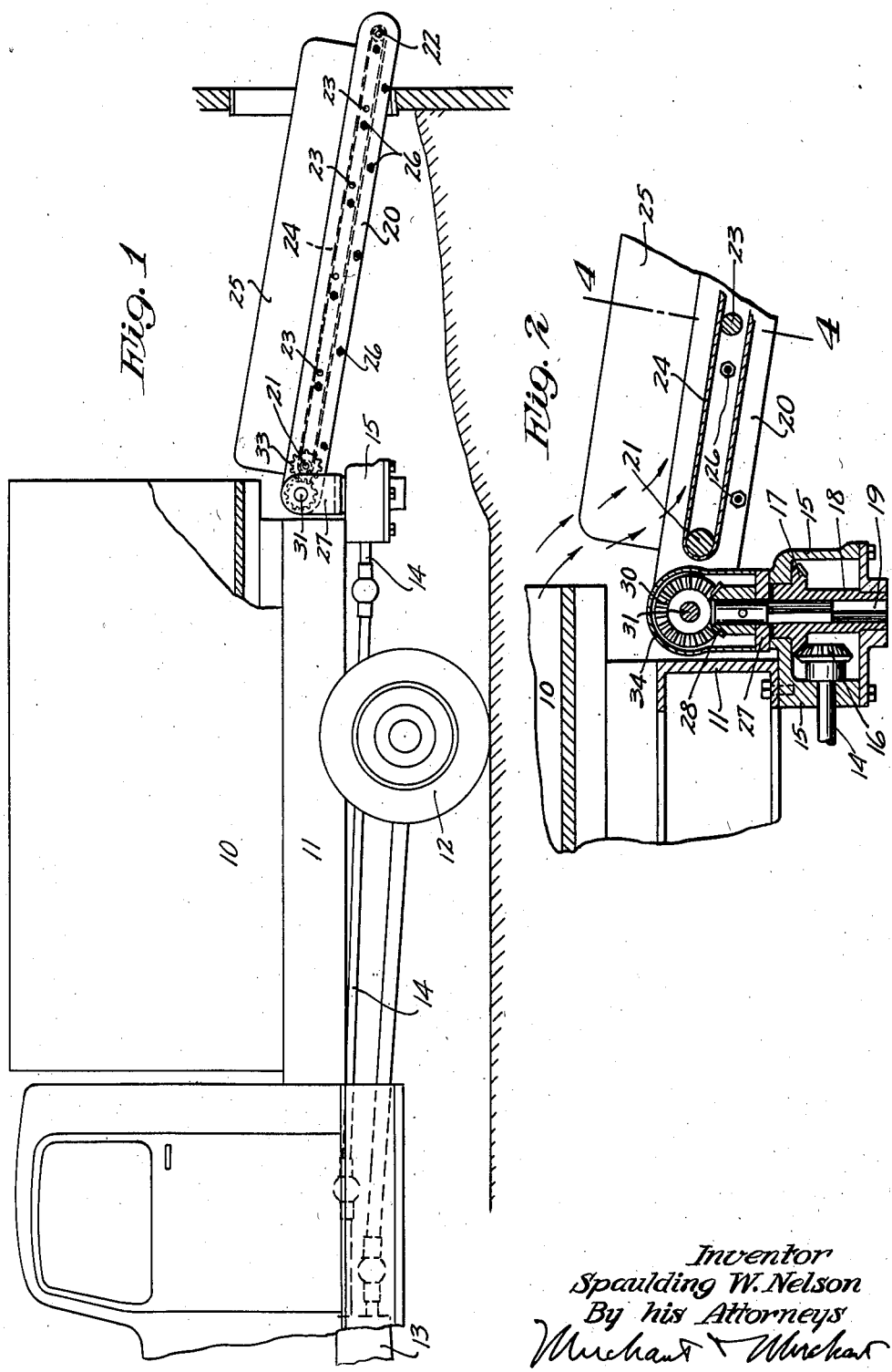
Inventor
Spaulding W. Nelson
By his Attorneys

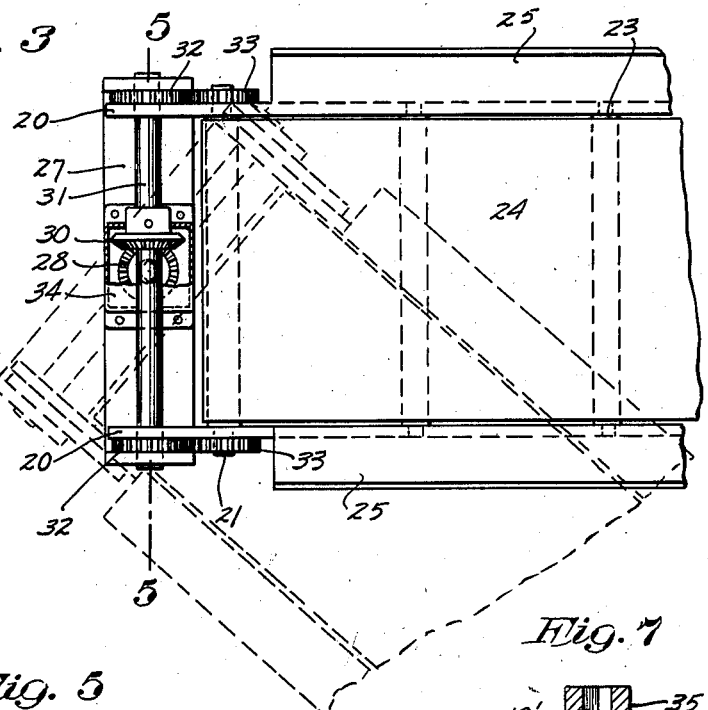
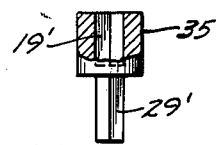
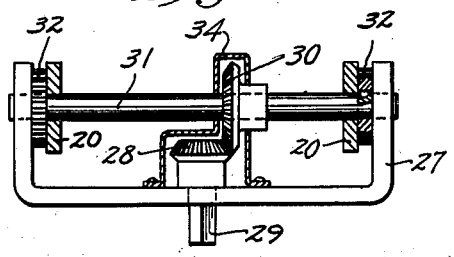
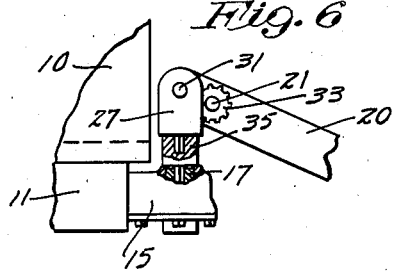
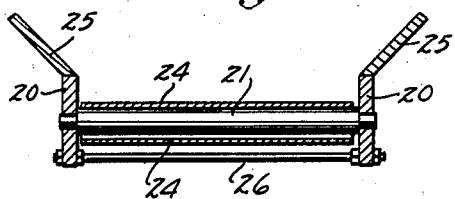

Patented Dec. 1, 1942

2,303,490

UNITED STATES PATENT OFFICE 2,303,490

UNLOADING ATTACHMENT FOR TRUCKS

Spaulding W. Nelson, Minneapolis, Minn.

Application December 12, 1940, Serial No. 369,768

1 Claim. (Cl. 198—125)

My invention relates particularly to motor-driven trucks and provides a delivery or unloading attachment therefor.

Motor-driven trucks equipped with my so-called unloading device are adapted for the delivery and discharge of coal and various like materials. The attachment involves an endless conveyor adapted to be driven from the transmission mechanism or other connection to the truck motor through a power take-off shaft such as frequently provided in connection with such trucks.

The objects of the invention briefly stated are the provision of a comparatively light unloading attachment that may be made at comparatively small cost; that may be easily handled and quickly attached to or detached from the truck; and which, in operation, is highly efficient both for unloading and loading, and which is capable of being readily moved or adjusted both laterally and vertically for the proper delivery or receiving of the material to be handled.

My improved attachment is such that it can be coupled in operative position simply by properly positioning the same and dropping or lowering it under the action of gravity into coupled relation with the power transmitting mechanism of the truck, and conversely, that can be uncoupled simply by picking it up or raising it from its operative position.

The improved device is illustrated in the accompanying drawings wherein like characters indicate like parts throughout the several views.

Referring to the drawings:

Fig. 1 is a view in side elevation, with some parts broken away, showing the attachment applied to a truck;

Fig. 2 is a fragmentary vertical section showing a portion of the truck and its power delivery mechanism and the receiving portion of the attachment;

Fig. 3 is a plan view of the conveyor attachment, some parts being broken away;

Fig. 4 is a transverse section taken on the line 4—4 of Fig. 2;

Fig. 5 is a transverse section taken on the line 5—5 of Fig. 3;

Fig. 6 is a fragmentary view, partly in side elevation and partly in section, illustrating a slightly different arrangement than that shown in Figs. 1 to 5, inclusive; and Fig. 7 is a detail, partly in elevation and partly in section, showing an extension coupling used in the structure illustrated in Fig. 6 and capable of use also in connection with the structure illustrated in Figs. 1 to 5, inclusive.

Referring first to Figs. 1 to 5, inclusive, the numeral 10 indicates the body, the numeral 11 the frame, the numeral 12 the rear wheels, and the numeral 13 the box or housing in the transmission mechanism. The numeral 14 indicates a jointed power take-off shaft driven in the usual or any suitable way from the transmission mechanism of the truck.

Rigidly secured to the rear end of the truck frame 11 is a strong gear box or housing 15 into which the rear end of the power take-off shaft 14 is extended and therein provided with a bevel pinion 16 that meshes with a bevel gear 17. This gear 17 is secured on or made a part of a long upright sleeve 18 that is journaled in the top and bottom portions of the gear box 15. This sleeve or long hub portion of the gear 17 is formed with an axial socket or passage 19 that is angular in cross-section. With this arrangement the hub of gear 17 is located at the rear of the frame 11 and is exposed through the top of the gear box 15.

The carrier attachment, which will operate either as an unloading or loading device and which is normally detached from the truck, involves a carrier frame 20 in the spaced sides of which are journaled an upper roller 21, a lower roller 22, and intermediate idle rollers 23. A wide endless conveyor belt 24, that runs over the said rollers, is driven from the upper roller 21. The frame 20 is preferably provided with side plates 25 that increase the holding capacity of the frame and keep the material confined on the belt 24.

The sides of the frame 20 are spaced and rigidly connected by suitable means such as tie-rods 26 shown in Fig. 4 and at their extreme upper ends the spaced members of said frame 20 are rigidly connected to a strong metallic yoke 27, best shown in detail in Fig. 5 and also in Fig. 3. Mounted on the yoke 27, at the transverse center thereof, is a bevel gear 28, the hub of which below the yoke 27, has a coupling shank 29 that is angular in cross-section and made to readily fit within the angular axial passage 19 of the sleeve-like hub 18 of the gear 17. The gear 28 meshes with a bevel gear 30 secured on a transverse shaft 31 journaled in the upturned prongs of the yoke 27. Shaft 31, near its ends, is provided with spur gears 32 that mesh with similar gears 33 on the projecting shaft or trunnions of conveyor driving roller 21. Preferably, and as shown in Figs. 3 and 5, the gears 28 and 30 are within a protecting casing 34 secured on the yoke 27.

To couple the conveyor attachment or so-called unloading device to the power device of the truck, it is only necessary to lift the yoke-equipped end so that the yoke will be rested upon an annular top flange of the gear box 15 with the angular shank 29 of gear 28 inserted in the angular seat 19 formed in the hub of gear 17. When thus connected, the carrier belt 24 will be driven through the transmission mechanism already clearly described and the attachment will be free for lateral oscillatory movements on the vertical axis of gear 17 and the frame 20 will be free for vertical oscillatory movements so that the carrier can be adjusted both as to height and as to lateral position. With the exact arrangement illustrated in Figs. 1 to 5, inclusive, the lateral oscillatory movement of the attachment will be somewhat limited because the yoke 27 will be below the opening in the rear end of box or body 10.

As a means for raising the yoke and corresponding end of the frame 20, and conveyor belt 24, I provide an auxiliary or extension coupling such as shown in Fig. 7 and indicated in said view and in Fig. 6 by the numeral 35. This coupling 35 is provided with a depending angular stem or shank 29' that corresponds to the shank 29 and with the angular socket 19' that corresponds to the socket or axial passage 19. Except for the application of this extension coupling 35, the structure illustrated in Fig. 6 is the same as that previously described, and hence, corresponding parts are indicated by the numerals previously applied thereto. In Fig. 6 the gear housing 15 is secured to the truck frame 11 at a point a little higher up than in Figs. 1 and 2. With the arrangement shown in Fig. 6, the yoke 27 is brought to a point above the bottom of the truck body 10 so that the yoke may swing into the open end of the said body, thereby giving the said yoke such freedom of oscillatory movements on a vertical axis that the frame 20 and belt 24 will be capable of horizontal oscillatory movements through 160° or more.

From the foregoing, it is evident that the conveyor attachment is capable of being adjusted to various altitudes and to different lateral positions and that by the reversal of direction of rotation of power take-off shaft 14 through the customary means, the conveyor belt 24 can be driven in either direction, and hence, used both for loading and unloading.

This improved attachment is capable of being made in various different lengths and may be even made so light and of such dimensions that it can be manipulated by one man. It is, as already indicated, very easy to lift the device and couple the same in operative position and it is obvious that it is also capable of being quickly detached when not in use or when the device is to be carried from one place to another with the truck. The unloading of coal and the delivery thereof to points reasonably distant from the truck is made an easy matter and one capable of being rapidly performed.

When the truck is one that has a dumping body, the load can be dumped and properly distributed on the conveyor and rapidly delivered to the point where it is to be received or stored. The device is equally serviceable for the delivery of various other materials, such as grain or sawdust. The yoke 27, in fact, constitutes an anchoring frame for the auxiliary conveyor and affords a very simple means for that purpose and for supporting the transverse shaft.

In accordance with the statutes I have described a commercial embodiment of the invention, but it will be understood that various alterations may be made within the scope of the invention herein disclosed and claimed.

What I claim is:

The combination with a supporting structure provided with a projecting gear box, of a power-driven sleeve-like gear mounted in said housing on a vertical axis and having an axial transversely angular socket, of a yoke detachably and gravity seated on said gear box for lateral swinging movements, said yoke having upturned ends, a transverse shaft journaled in the upturned ends of said yoke, a bevel gear journaled on the intermediate portion of said yoke and having a depending angular shank detachably engageable in the socket of the gear on said gear box, a bevel gear on the intermediate portion of said transverse shaft meshing with the bevel gear just noted, a conveyor frame having side bars pivotally connected to the upturned prongs of said yoke by said transverse shaft, and a second transverse shaft journaled on the side bars of said conveyor frame and having spur gears at its ends, spur gears on the end of said first noted transverse shaft meshing with the last noted spur gears, and a conveyor belt driven from said second noted transverse shaft, and in which structure the said loading attachment may be removed simply by lifting the same and may be coupled for operation by a reverse movement dropping the above noted trunnion-equipped gear into the socket of the above noted socket-equipped gear.

SPAULDING W. NELSON.